E. J. SMITH.
CHURN.
APPLICATION FILED DEC. 26, 1908.
929,038.
Patented July 27, 1909.
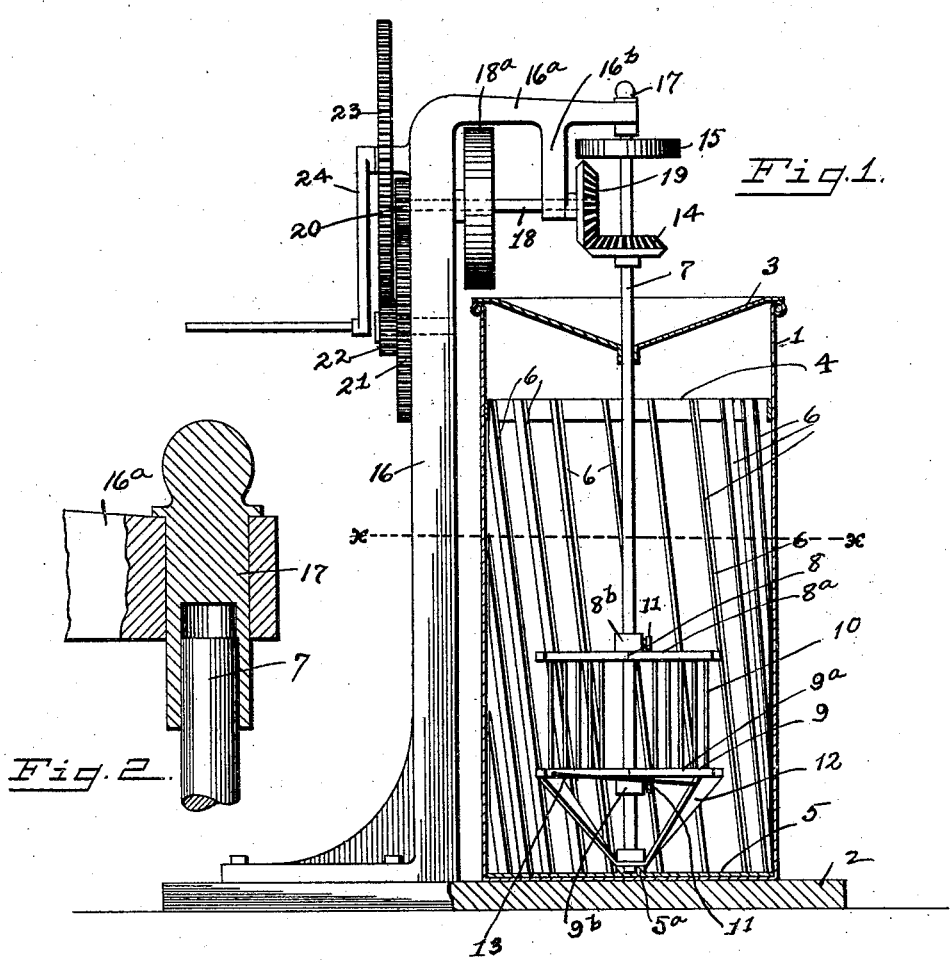
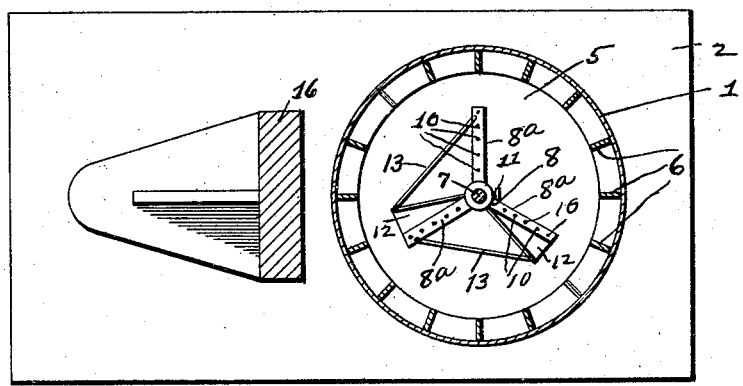
Witnesses
Carl Stoughton
A. L. Phelps
Fig. 3.
Inventor
Emery J. Smith
By C. C. Shepherd
Attorney

UNITED STATES PATENT OFFICE.

EMERY J. SMITH, OF COLUMBUS, OHIO.

CHURN.

No. 929,038.  Specification of Letters Patent.  Patented July 27, 1909.

Application filed December 26, 1908. Serial No. 469,479.

*To all whom it may concern:*

Be it known that I, EMERY J. SMITH, a citizen of the United States, residing at Columbus, in the county of Franklin and State of Ohio, have invented certain new and useful Improvements in Churns, of which the following is a specification.

My invention relates to churns of that class in which a rotary dasher is employed and the objects of my invention are to provide an improved construction of churn and dasher therefor, whereby a desirable increase in the agitation of the cream is attained and whereby currents will be established and broken, which will tend to readily convert the cream into butter; to provide in conjunction with the dasher, improved means for lifting the cream or forcing the same upward in contact with the dasher from the lower portion of the casing and to produce other improvements the details of which will be more fully pointed out hereinafter. These objects I accomplish in the manner illustrated in the accompanying drawing, in which:

Figure 1 is a central vertical section of my improved churn, showing the operating mechanism and dasher in elevation, Fig. 2 is an enlarged vertical sectional view through the detachable bearing of the upper end of the dasher shaft, and, Fig. 3 is a sectional view on line $x$—$x$ of Fig. 1.

Similar numerals refer to similar parts throughout the several views.

In carrying out my invention, I employ a vertically disposed can or casing 1 which is adapted to be supported upon a horizontal base 2. This can body which is provided at its upper end with a detachable lid 3, has detachably inserted therein a ribbed cage or frame of general cylindrical form, which comprises an upper circular band or ring 4 and a lower end disk 5, the latter being connected at intervals with the top band 4, by parallel diagonally arranged blades 6 which project within said cage or frame.

7 represents a vertical dasher shaft, which passes centrally through and is journaled in the lid or cover 3, the lower end of said dasher shaft being pivoted in the central socket $5^a$ of the disk 5, which disk bears upon the bottom of the can or casing 1. Toward its lower end the vertical dasher shaft carries a dasher, which comprises an upper horizontal spider frame 8 and a similar lower frame 9, each of which comprises a plurality of radially arranged arms $8^a$ and $9^a$ which project from a central hub, said hubs being indicated respectively at $8^b$ and $9^b$. Extending vertically between the arms $8^a$ and $9^a$ of the members 8 and 9 are radially arranged rows of agitating wires 10. The hubs of the members 8 and 9 are made adjustable on the shaft 7 by being secured thereto by set screws 11 which pass through said hubs and engage the shaft.

From the outer ends of the lower arms $9^a$ are extended inwardly and downwardly to the lower end portion of the shaft 7, fixed twisted or fan-like blades 12 and the upper portions of these blades are secured in connection with the lower member 9 through the medium of brace wires 13 which extend to the outer ends of the arms $9^a$. Above the top or lid 3, I provide the shaft 7 with a bevel pinion wheel 14 and above said pinion wheel, said shaft carries a fly-wheel 15.

Adjacent to one side of the can or casing 1, I provide a vertical frame standard 16, which terminates in an upper horizontal arm $16^a$ which extends over the upper end of the dasher shaft, as shown in Fig. 1. The outer end of the arm $16^a$ has a vertical opening formed therein and into this opening is inserted from above a headed pin 17, the lower socketed end of which receives and forms a bearing for the upper end of the shaft 7.

Journaled in the upper portion of the frame standard 16 and in the lower portion of a vertical depending member $16^b$ of the arm $16^a$ is a horizontal shaft 18 on one end of which is carried a bevel pinion wheel 19 which is adapted to gear with the pinion 14. On the outer end of the shaft 18 is carried a pinion gear wheel 20, the teeth of which mesh with those of a gear wheel 21 pivoted to the standard 16, said gear wheel 21 having affixed to its outer face a pinion wheel 22. With the pinion 22 engages a comparatively large gear wheel 23 which is carried on the shaft of an operating crank 24, said crank shaft being journaled in the outer portion of the frame standard 16. Upon the shaft 18 is carried a fly-wheel $18^a$.

It will be understood that the cream to be converted into butter, is poured into the can or casing 1, the body of cream thus employed occupying the lower portion of the can below the dasher frame 9. Rotation being imparted to the shaft 7 through the medium of the crank 24 and the various gear connections heretofore described, it is obvious that the rotary traveling movement of the converging fan-like blades 12 will operate to force the cream spirally upward into contact with the wires 10 of the dasher, which through the rapid rotation of the dasher, will serve to break the cream into outwardly moving currents, thereby imparting the desired butter producing agitation to the cream. In addition to the agitating action of the fan-like blades 12 and the dasher body, it is obvious that the whirling body of cream will be thrown into contact with the fixed blades 6, said blades serving to break the revolving currents at the outer side of the mass and permitting the cream to move downward to take the place of the body of cream displaced by the upward movement described. From this operation, it will be understood that the cream will be prevented from settling in the bottom of the casing and will be constantly elevated therefrom into contact with the dasher wires, thereby insuring a thorough agitation which will result in the production of butter in a comparatively short time.

In order to remove the butter from the can or casing, it is obvious that the bearing pin 17 may be lifted out of the opening in the arm 16ª, thus disengaging said pin from the dasher shaft and permitting the casing or can 1 to be lifted to one side. This being accomplished, the dasher and the internal frame 4 may be readily removed from the can.

What I claim is:

1. In a churn, the combination with a casing and a cover therefor, of a shaft journaled vertically within said casing, a main dasher body carried on said shaft comprising agitating members, converging fan-like blades depending from said main dasher body, and means for imparting a rapid rotary motion to said dasher shaft.

2. In a churn, the combination with a casing, and a removable internal cage-like member comprising diagonally arranged blades or bars, of a shaft vertically journaled in said casing, a main dasher body carried on said shaft and comprising agitating members, fan-like blades depending from said dasher body and converging toward their lower ends, and means for imparting rapid rotary motion to said dasher shaft.

In testimony whereof I affix my signature in presence of two witnesses.

EMERY J. SMITH.

Witnesses:
L. CARL STOUGHTON,
A. L. PHELPS.